(12) United States Patent
Neet

(10) Patent No.: US 10,069,366 B2
(45) Date of Patent: Sep. 4, 2018

(54) TERMINAL ASSEMBLY FOR AN ELECTRIC MACHINE

(71) Applicant: Kirk Neet, Pendleton, IN (US)

(72) Inventor: Kirk Neet, Pendleton, IN (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/681,657

(22) Filed: Aug. 21, 2017

(65) Prior Publication Data

US 2017/0353073 A1     Dec. 7, 2017

Related U.S. Application Data

(63) Continuation of application No. 14/738,053, filed on Jun. 12, 2015, now Pat. No. 9,768,655.

(51) Int. Cl.
    *H02K 3/28*     (2006.01)
    *H02K 3/50*     (2006.01)

(52) U.S. Cl.
    CPC ............. *H02K 3/28* (2013.01); *H02K 3/505* (2013.01); *H02K 2203/03* (2013.01); *H02K 2203/09* (2013.01)

(58) Field of Classification Search
    CPC ........................................................ H02K 3/28
    See application file for complete search history.

(56) References Cited

U.S. PATENT DOCUMENTS

| | | | |
|---|---|---|---|
| 5,682,070 A | 10/1997 | Adachi et al. | |
| 6,552,908 B2 | 4/2003 | DeNardis | |
| 6,808,137 B2 | 10/2004 | Hong | |
| 7,808,137 B2 | 10/2010 | Meet et al. | |
| 7,989,996 B2 | 8/2011 | Wolf et al. | |
| 8,734,133 B2 | 5/2014 | Tanahashi et al. | |
| 8,803,378 B2 | 8/2014 | Sonohara et al. | |
| 9,318,990 B2 | 4/2016 | Frank | |
| 9,768,655 B2 * | 9/2017 | Neet ........................ | H02K 3/28 |
| 2005/0006973 A1 | 1/2005 | Bradfield | |

(Continued)

FOREIGN PATENT DOCUMENTS

| | | | |
|---|---|---|---|
| JP | 2006094573 A | 4/2006 | |
| KR | 1020110135221 A | 12/2011 | |

OTHER PUBLICATIONS

International Search Report and Written Opinion dated Sep. 12, 2016 in related PCT Application No. US2016/036442, 11 pages.

*Primary Examiner* — Robert W Horn
(74) *Attorney, Agent, or Firm* — Cantor Colburn LLP

(57) ABSTRACT

An alternator including a housing, and a stator fixedly mounted relative to the housing. The stator includes a plurality of stator slots and a stator winding arranged in the plurality of stator slots. The stator winding includes at least five stator leads extending from five adjacent ones of the plurality of stator slots. A terminal assembly is mounted to an outer surface of the housing and is connected with at least three of the at least five stator leads. The terminal assembly includes a body formed from a non-electrically conductive material and a plurality of conductive members at least partially covered by the body. The plurality of conductive members is associated with the stator winding. Each of the plurality of conductive members includes a plurality of input connectors spread out along the body in an arc that is greater than 90°.

12 Claims, 4 Drawing Sheets

(56) References Cited

U.S. PATENT DOCUMENTS

| | | |
|---|---|---|
| 2008/0073986 A1 | 3/2008 | Lee |
| 2012/0126638 A1 | 5/2012 | Tanaka |
| 2013/0264899 A1 | 10/2013 | Goto et al. |
| 2014/0175922 A1 | 6/2014 | Jore et al. |
| 2014/0292125 A1 | 10/2014 | Kanda et al. |
| 2014/0306562 A1 | 10/2014 | Egami |
| 2015/0097453 A1 | 4/2015 | Nishikawa et al. |
| 2015/0188376 A1 | 7/2015 | Yamaguchi et al. |
| 2015/0270797 A1 | 9/2015 | Roesner |
| 2017/0353073 A1* | 12/2017 | Neet ................. H02K 3/28 |

* cited by examiner

TERMINAL ASSEMBLY FOR AN ELECTRIC MACHINE

CROSS REFERENCE TO RELATED APPLICATION

This application is a continuation of U.S. application Ser. No. 14/738,053 filed Jun. 12, 2015, the disclosure of which is incorporated by reference herein in its entirety.

BACKGROUND OF THE DISCLOSURE

Exemplary embodiments pertain to the art of electric machines and, more particularly, to a terminal assembly for an electric machine.

Many motor vehicles include an alternator that transforms mechanical energy into electrical energy that is used to charge an onboard battery. Generally, alternators include a rotor having rotor windings that are rotated within a stator having stator windings. The rotor may include a pair of slip rings that are electrically coupled to the rotor windings. When the rotor is rotated within the stator, an electrical field is developed inducing an electrical current in the stator windings. The current is passed from the stator to terminal assembly having a number of conductive members. Each conductive member of the terminal assembly creates an electrical connection between the stator winding and a plurality of diodes mounted to a housing of the alternator.

BRIEF DESCRIPTION OF THE DISCLOSURE

Disclosed is an alternator including a housing, and a stator fixedly mounted relative to the housing. The stator includes a plurality of stator slots and a stator winding arranged in the plurality of stator slots. The stator winding includes at least five stator leads extending from five adjacent ones of the plurality of stator slots. A terminal assembly is mounted to an outer surface of the housing and is connected with at least three of the at least five stator leads. The terminal assembly includes a body formed from a non-electrically conductive material and a plurality of conductive members at least partially covered by the body. The plurality of conductive members is associated with the stator winding. Each of the plurality of conductive members includes a plurality of input connectors spread out along the body in an arc that is greater than 90°.

Also disclosed is an alternator including a housing, and a stator fixedly mounted relative to the housing. The stator includes a plurality of stator slots and a first stator winding group and a second stator winding group arranged in the plurality of stator slots. The first and second stator windings groups include at least five stator leads extending from at least five adjacent ones of the plurality of stator slots. A terminal assembly is mounted to an outer surface of the housing and is connected with at least three of the at least five stator leads. The terminal assembly includes a body formed from a non-electrically conductive material, and a first plurality of conductive members at least partially covered by the body. The first plurality of conductive members is associated with first the stator winding group. A second plurality of conductive members is at least partially covered by the body. The second plurality of conductive members is associated with the second stator winding group. Each of the first and second pluralities of conductive members includes a plurality of input connectors. The plurality of input connectors of each of the first and second plurality of conductive members is spread out along the body in an arc that is greater than 90°.

BRIEF DESCRIPTION OF THE DRAWINGS

The following descriptions should not be considered limiting in any way. With reference to the accompanying drawings, like elements are numbered alike.

DETAILED DESCRIPTION OF THE DISCLOSURE

A detailed description of one or more embodiments of the disclosed apparatus and method are presented herein by way of exemplification and not limitation with reference to the Figures.

Figure 1:
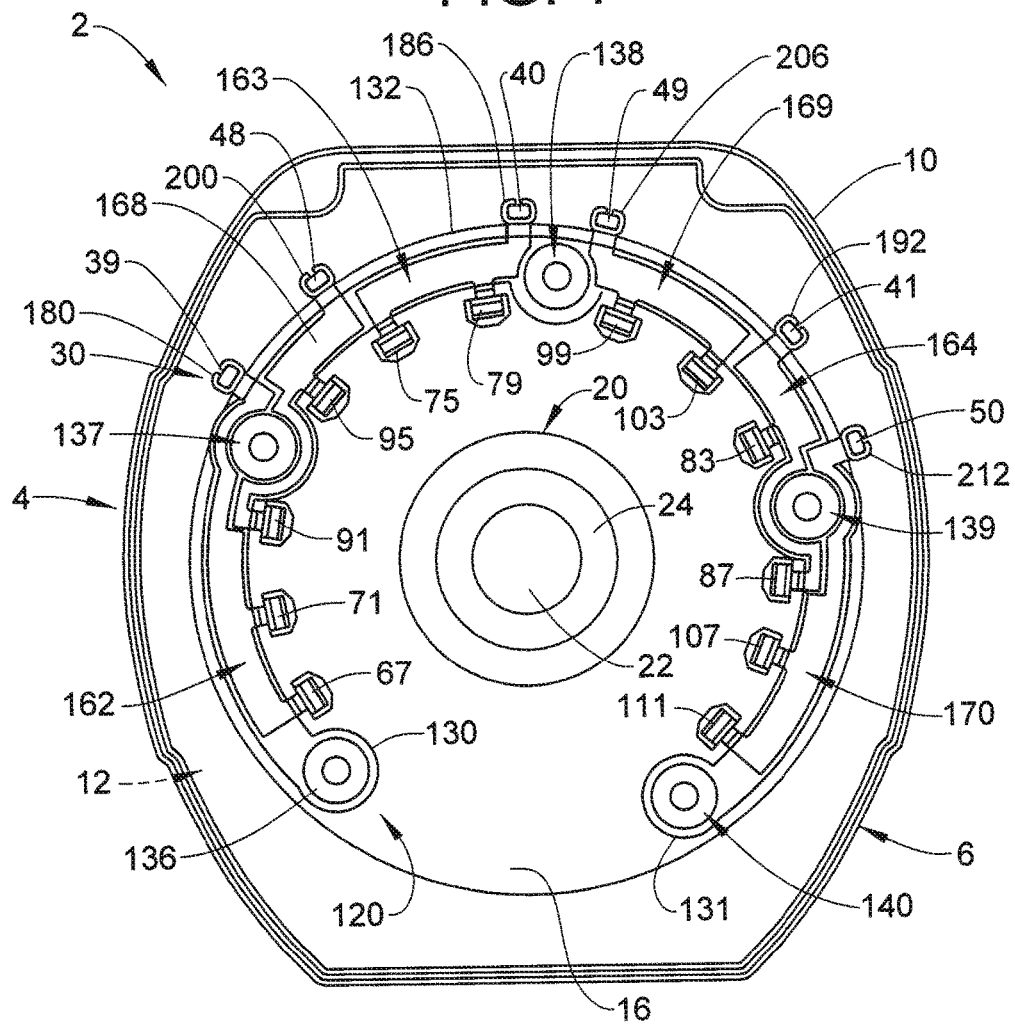
FIG. 1 depicts an electric machine in the form of an alternator including a terminal assembly, in accordance with an exemplary embodiment.
Figure 2:
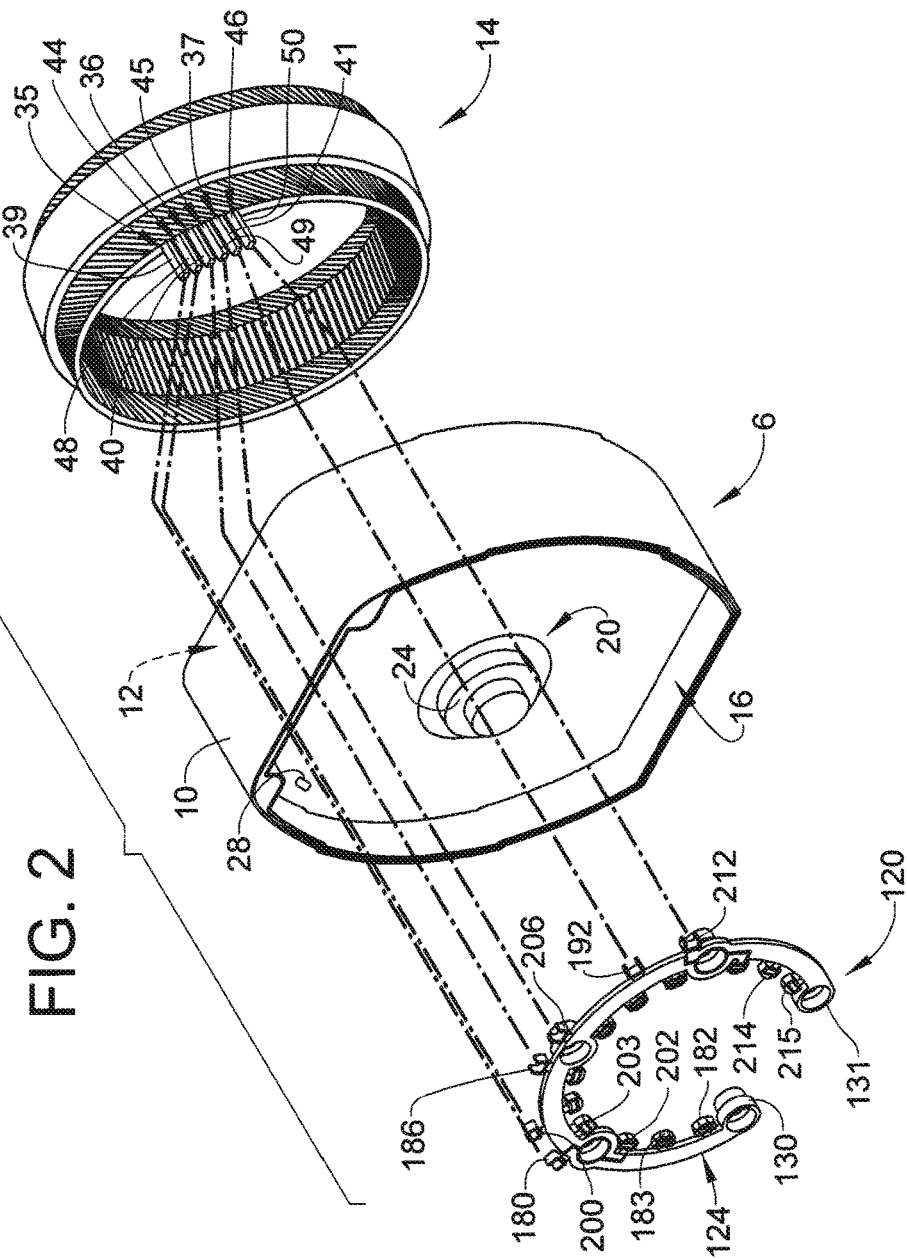
FIG. 2 depicts a partially exploded view of the alternator of FIG. 1.

An electric machine, in accordance with an exemplary embodiment, is indicated generally at 2, in FIG. 1. Electric machine 2 is shown in the form of an alternator 4 having a housing 6. Housing 6 includes an outer surface 10 that defines an interior portion 12 (FIG. 2). A stator 14 including a plurality of stator slots, indicated generally at 16, is arranged in interior portion 12. A rotor (not shown) is also arranged in interior portion 12. As shown in FIG. 2, housing 6 includes an external surface 16 that provides a mounting surface (not separately labeled) for various electrical connections, as will be more fully described below. External surface 16 includes a bearing support portion 24 that receives a bearing (not shown) associated with the end of the rotor shaft. External surface 16 is also shown to include a number of openings, one of which is indicated at 28, for receiving a corresponding one of a plurality of stator windings 30.

Figure 3:
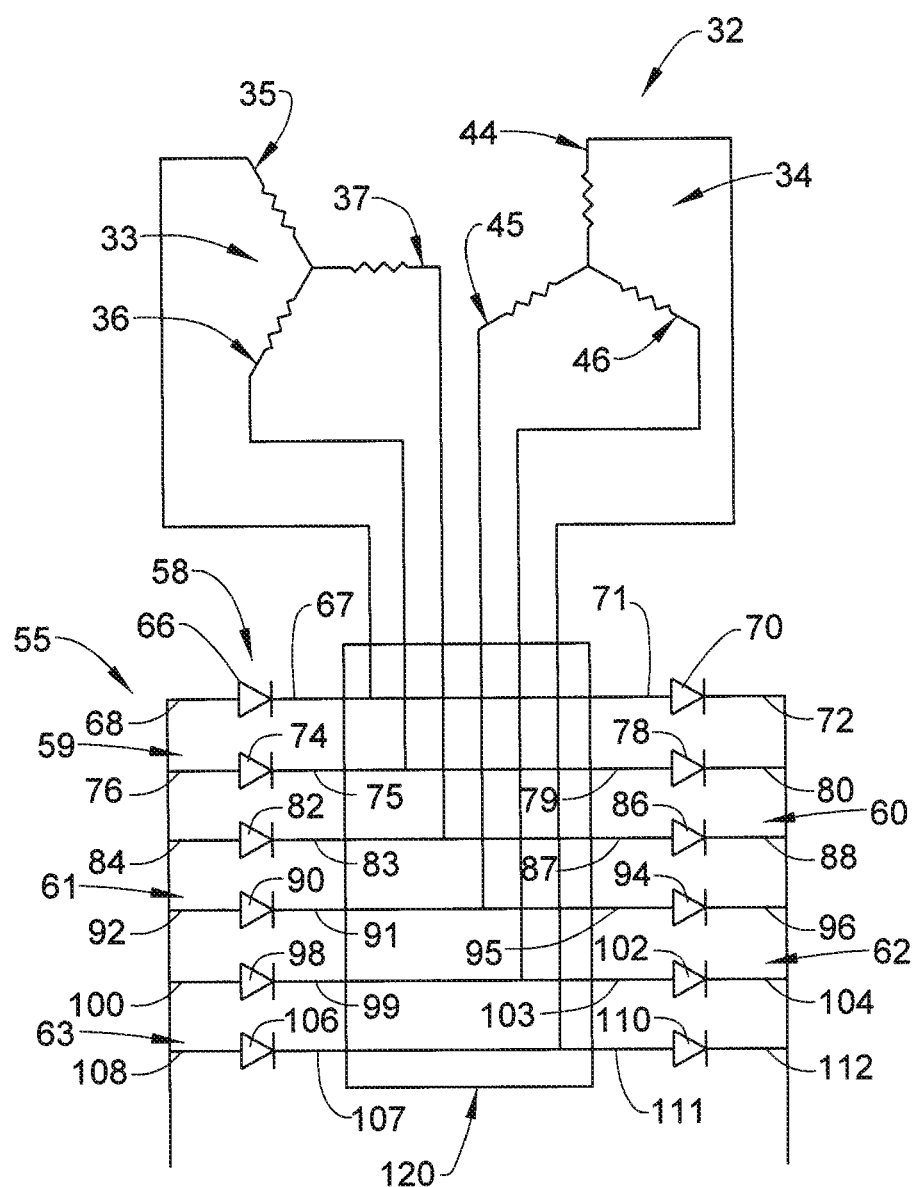
FIG. 3 depicts a schematic diagram illustrating electrical connections through the terminal assembly, in accordance with an exemplary embodiment.
Figure 4:
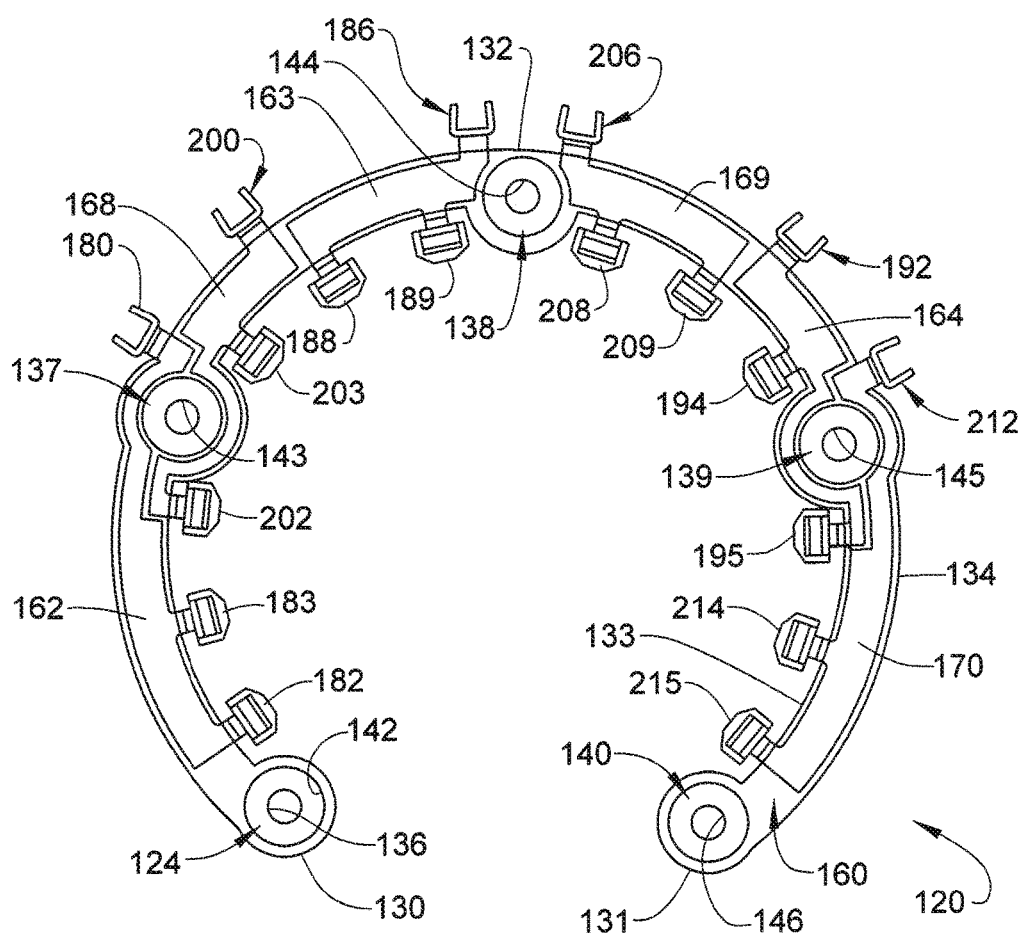
FIG. 4 depicts a plan view of the terminal assembly of FIG. 1.

In the exemplary embodiment shown, stator 14 includes a three-phase stator winding 32 arranged, at least in part, in the plurality of stator slots 16. Stator winding 32 comprises two three-phase winding groups 33 and 34, as shown in FIG. 3. Stator 14 may also include a stator winding with one five phase winding or one seven phase winding as known by one of ordinary skill in the art. Stator winding group 33 defines a first wye stator winding group, and stator winding group 34 defines a second wye stator winding group. First wye stator winding group 33 includes a first phase 35, a second phase 36 and a third phase 37. Each phase 35, 36, and 37 includes a corresponding stator lead 39, 40 and 41 that passes from stator 14 through housing 6. Similarly, second wye stator winding group 34 includes a first phase 44, a second phase 45 and a third phase 46. Each phase 44, 45 and 46 includes a corresponding stator lead 48, 49, and 50 that passes through housing 6.

As also shown in FIG. 3, three-phase stator winding 32 is electrically connected to a plurality of diode pairs 55. More specifically, first phase 35 of first wye stator winding group 33 is connected to a first diode pair 58, second phase 36 of first wye stator winding group 33 is connected to a second diode pair 59 and third phase 37 of first wye stator winding group 33 is connected to a third diode pair 60. Similarly, first phase 44 of second wye stator winding group 34 is connected to a fourth diode pair 61, second phase 45 of second wye stator winding group 34 is connected to a fifth diode pair 62, and third phase 46 of second wye stator winding group 34 is connected to a sixth diode pair 63.

First diode pair 58 includes a first diode 66 including an input 67 and an output 68 and a second diode 70 having an input 71 and an output 72. Second diode pair 59 includes a third diode 74 including an input 75 and an output 76 and a fourth diode 78 having an input 79 and an output 80. Third diode pair 60 includes a fifth diode 82 including an input 83 and an output 84 and a sixth diode 86 having an input 87 and an output 88. Fourth diode pair 61 includes a seventh diode 90 including an input 91 and an output 92 and an eighth diode 94 having an input 95 and an output 96. Fifth diode pair 62 includes a ninth diode 98 including an input 99 and an output 100 and a tenth diode 102 having an input 103 and an output 104. Sixth diode pair 63 includes an eleventh diode 106 including an input 107 and an output 108 and a twelfth diode 110 having an input 111 and an output 112. Each diode pair 58-63 is connected to one of the plurality of leads, such as stator lead 41, of three-phase stator winding 32 through a terminal assembly 120 arranged on alternator 4.

In accordance with an exemplary embodiment, terminal assembly 120 includes a body 124 formed from an electrically insulated material. Body 124 may extend from a first end 130 to a second end 131 through an intermediate portion 132 having radially inwardly facing surface 133 and a radially outwardly facing surface 134. Body 124 includes a plurality of mounting sections 136-140 that provide an interface between terminal assembly 120 and housing 6. More specifically, each mounting section 136-140 includes a corresponding opening 142-146 that receives a mechanical fastener (not shown) that secures terminal assembly 120 to housing 6 external surface 16.

In further accordance with an exemplary embodiment, terminal assembly 120 includes a plurality of conductive members 160 that are encased by body 124 and serve as an interface between three-phase stator winding 32 and diode pairs 58-63. Conductive members 160 includes a first wye, first conductive member 162, a first wye, second conductive member 163, and a first wye, third conductive member 164. Terminal assembly 120 also includes a second wye, first conductive member 168, a second wye, second conductive member 169, and a second wye, third conductive member 170.

First wye, first conductive member 162 includes an input connector 180 electrically coupled to first phase 35 of first wye winding group 33, a first output connector 182 electrically coupled to input 67 of first diode 66 and a second output connector 183 electrically coupled to input 71 of second diode 70. First wye, second conductive member 163 includes an input connector 186 electrically coupled to second phase 36 of first wye winding group 33, a first output connector 188 electrically coupled to input 75 of third diode 74 and a second output connector 189 electrically coupled to input 79 of fourth diode 78. First wye, third conductive member 164 includes an input connector 192 electrically coupled to third phase 37 of first wye winding group 33, a first output connector 194 electrically coupled to input 83 of fifth diode 82 and a second output connector 195 electrically coupled to input 87 of sixth diode 86. Each input connector 180, 186 and 192 extends from radially outwardly facing surface 134 and each output connector 182, 183, 188, 189, 194, 195, 202, 203, 208, 209, 214 and 215 extends from radially inwardly facing surface 133.

Similarly, second wye, first conductive member 168 includes an input connector 200 electrically coupled to first phase 44 of second wye winding group 34, a first output connector 202 electrically coupled to input 91 of seventh diode 90 and a second output connector 203 electrically coupled to input 95 of eighth diode 94. Second wye, second conductive member 169 includes an input connector 206 electrically coupled to second phase 45 of second wye winding group 34, a first output connector 208 electrically coupled to input 99 of ninth diode 98 and a second output connector 209 electrically coupled to input 103 of tenth diode 102. Second wye, third conductive member 170 includes an input connector 212 electrically coupled to third phase 47 of second wye winding group 34, a first output connector 214 electrically coupled to input 107 of eleventh diode 106 and a second output connector 215 electrically coupled to input 111 of twelfth diode 110. Each input connector 180, 186 and 192 extends from radially outwardly facing surface 134 and each output connector 182, 183, 188, 189, 194, 195, 202, 203, 208, 209, 214 and 215 extends from radially inwardly facing surface 133.

In the exemplary embodiment shown, first wye, third conductive member 164 radially, inwardly overlaps second wye, third conductive member 170 at mounting section 139 and second wye, first conductive member 168 radially inwardly overlaps first wye, first conductive member 162 at mounting section 137. In other words, only one of conductive members 162-164 associated with first wye windings group 33 radially inwardly overlaps one of conductive members 168-170 associated with second wye windings group 34, and only one of conductive members 168-170 associated with second wye windings group 34 radially inwardly overlaps one of conductive members 162-164 associated with first wye windings 33.

Further, while stator leads extend from the stator 14 in an arc that is less than about 90°, input connectors 180, 186, 192, 200, 206, 212 of first wye conductive members 162-164 and second wye conductive members 168-170 are spread out in an arc that is greater than 90°. One or more of stator leads 39-41 and/or 48-50 may be routed from inside the arc to outside the arc. In this manner stator leads 39-41 and/or 48-50 may be connected to input connectors that may reside outside the arc.

In accordance with another aspect of an exemplary embodiment, stator leads 39-41 and/or 48-50 may extend from stator 14 in an arc that is less than 75°. In accordance with still another aspect of an exemplary embodiment, input connectors 180, 186, 192, 200, 206, 212 of the first wye conductive members 162-164 and second wye conductive members 168-170 may be spread out in an arc of 140° or more. Limiting the number of terminals that radially inwardly overlap reduces an overall width of the terminal assembly. Limiting terminal overlaps also reduces heat buildup in the terminal assembly. Further, spreading out the input connectors of the conductive members along an arc that is greater than 90° enables each conductive member to be shorter thereby reducing the amount of raw materials needed to form the terminal assembly.

For example, input connectors and diodes may be spread out on an arc that is greater than 90° and less than about 300°. Each conductive member includes an input connector configured to be electrically bonded (such as weld, solder and the like) to one or more stator leads, and output connecters which are configured to be electrically bonded to a diode. Since the diodes are spread out on an arc greater than about 90°, all of the output connectors are spread out on an arc greater than 90°. To minimize radial overlapping of the conductive members, all of the input connectors are also spread out on an arc greater than 90°. Therefore the stator leads may be routed from the stator at an arc less 90° to an arc which is greater than 90° to be electrically connected to the input connectors of the conductive members.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An alternator comprising:
    a housing;
    a stator fixedly mounted relative to the housing, the stator including a plurality of stator slots and a stator winding arranged in the plurality of stator slots, the stator winding including at least five stator leads extending from five adjacent ones of the plurality of stator slots; and
    a terminal assembly mounted to an outer surface of the housing and connected with at least three of the at least five stator leads, the terminal assembly comprising:
        a body formed from a non-electrically conductive material; and
        a plurality of conductive members at least partially covered by the body, the plurality of conductive members being associated with the stator winding, wherein
        each of the plurality of conductive members including a plurality of input connectors spread out along the body in an arc that is greater than 90°.

2. The alternator according to claim 1, wherein the at least five stator leads includes at least six stator leads extending from six adjacent ones of the plurality of stator slots.

3. The alternator according to claim 1, wherein the stator winding is formed from a conductor having a substantially rectangular cross-section.

4. The alternator according to claim 1, wherein each of the plurality of conductive members includes at least two output connectors, the input connector of each of the plurality of conductive members being electrically connected to the stator winding.

5. The alternator according to claim 4, wherein the body includes a radially inwardly facing surface and a radially outwardly facing surface, the input connector of the plurality of conductive members being arranged on the radially outwardly facing surface.

6. The alternator according to claim 5, wherein the two output connectors of the plurality of conductive members is arranged on the radially inwardly facing surface.

7. The alternator according to claim 1, wherein the body includes a plurality of mounting sections receiving a mechanical fastener joining the terminal assembly to the housing.

8. An alternator comprising:
    a housing;
    a stator fixedly mounted relative to the housing, the stator including a plurality of stator slots and a first stator winding group and a second stator winding group arranged in the plurality of stator slots, the first and second stator windings groups including at least five stator leads extending from at least five adjacent ones of the plurality of stator slots; and
    a terminal assembly mounted to an outer surface of the housing and connected with at least three of the at least five stator leads, the terminal assembly comprising:
        a body formed from a non-electrically conductive material; and
        a first plurality of conductive members at least partially covered by the body, the first plurality of conductive members being associated with first the stator winding group;
        a second plurality of conductive members at least partially covered by the body, the second plurality of conductive members being associated with the second stator winding group, each of the first and second pluralities of conductive members including a plurality of input connectors, wherein the plurality of input connectors of each of the first and second plurality of conductive members is spread out along the body in an arc that is greater than 90°.

9. The alternator according to claim 8, wherein the at least five stator leads includes at least six stator leads extending from six adjacent ones of the plurality of stator slots.

10. The alternator according to claim 8, wherein the first and second winding groups are each formed by a corresponding conductor having a substantially rectangular cross-section.

11. The alternator according to claim 8, wherein the no more than one of the first plurality of conductive members overlaps the one of the second plurality of conductive members at one of the plurality of mounting sections.

12. The alternator according to claim 8, wherein the no more than one of the second plurality of conductive members overlaps the one of the first plurality of conductive members at one of the plurality of mounting sections.

* * * * *